United States Patent Office 3,451,816
Patented June 24, 1969

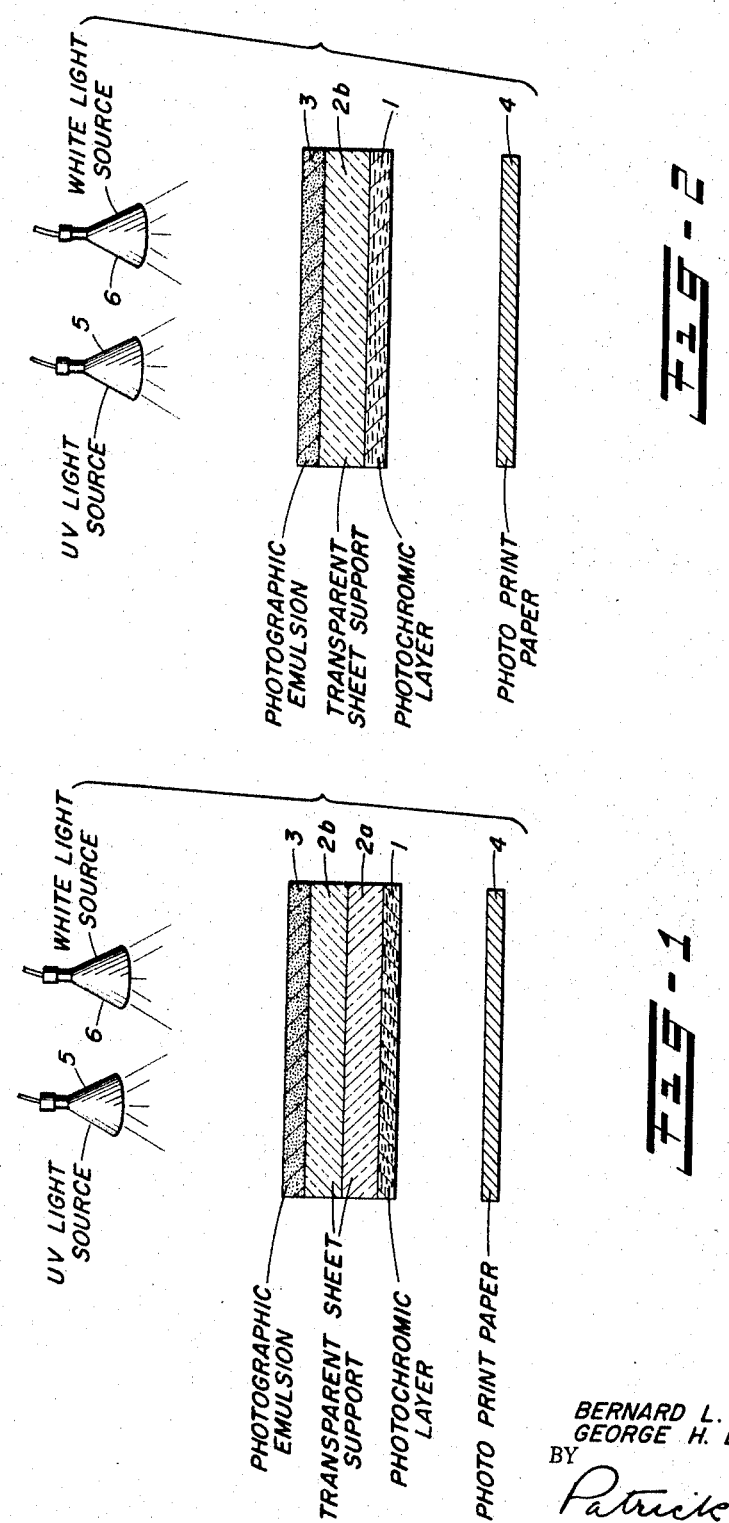

3,451,816
PHOTOGRAPHIC DODGING METHOD
Bernard Leo Williams, Martinsville, N.J., and George Henry Dorion, New Canaan, Conn., assignors to American Cyanamid Company, Stamford, Conn., a corporation of Maine
Filed June 16, 1965, Ser. No. 464,301
Int. Cl. G03c 5/06, 1/78
U.S. Cl. 96—44   2 Claims

ABSTRACT OF THE DISCLOSURE

A method of dodging photographic film using an article of manufacture which is a photographic film comprising in permanent integral laminated arrangement a substantially transparent support sheet, with a photochromic layer on one side and a photographic emulsion layer on the other side.

---

This invention relates to materials and methods for photographic dodging. More particularly, the invention pertains to negative photographic film which when used to produce a reversal or positive image therefrom has the built-in capability of attenuating, emphasizing or correcting the density scales or variations which are normally lost, deemphasized or overemphasized during printing or projection of the positive image. The invention further pertains to a method of photographic dodging utilizing said photographic negative film having a built-in capability for photographic dodging.

In order to attenuate or sharpen foreground and background detail in positive prints or projected positive images produced from photographic negative film or transparencies, it has become conventional to employ the technique known as photographic dodging. The technique is useful for interpretation of fine detail because of the incapability in photographic positive printing paper or projection screens of precisely reflecting the subtle variations in density of the negative film image. The problem of obtaining a projected or a positive print image of greater definition may also be described as the problem of improving the contrast capability, i.e., the visualization of fine details in large areas of radically different densities in the same negative image and the minimization of unevenness in the negative image due to errors in technique such as uneven development and uneven lighting.

At least five photographic dodging methods are known. They are termed "dodging" techniques because in each the portions of the printing or positive image projection light is blocked, avoided or "dodged" in order to improve the positive image.

In one method, the operator imposes an opaque cutout between the light source employed and the low density areas of a negative to be corrected during the printing or enlarging process thereof thereby selectively reducing the duration of exposure of the light-sensitive layer to be exposed in registration with such low density areas. By suitably locating such a cutout those areas of the photosensitive printing paper in registration with the low density areas of the negative are exposed to the light source for shorter periods of time thereby decreasing the contrast variations between the areas of the resulting positive image.

In a second method, the same result is often obtained manually by an operator passing his hands back and forth in the printing light between the negative film or transparency and the positive printing paper. However, each of the latter techniques are inaccurate and unreliable since they depend too greatly on an operator's timing and dexterity.

A third correction method involves first printing an under-exposed positive image mask from an original negative. Then the resulting positive mask is superposed in registration with the negative during contact printing or enlarging. This dodging procedure is time consuming and it is difficult to secure precise registration of the original negative and the processed positive mask.

A fourth method for the dodging of photographic negatives involves the use of an electronic scanning device. However, the device is expensive and often results in a halo effect in the image.

In a fifth method of photographic dodging, as exemplified by U.S. Patents 3,105,761 to Foris and 3,160,504 to Montani, a photochromic layer affixed to a supporting sheet of material or which is self-supporting by incorporation in or on a transparent film such as an acetate, polyester or acrylic plastic material, is first exposed to light of one wave length through the negative film or transparency to produce a masking image and thereafter the masking photochromic layer in register with the negative film is exposed to actinic light to produce a corrected positive print. The Montani method is an improvement over the Foris technique in that actinic light of a critical intensity is employed in critical exposure time to reduce the tendency of the masking image to bleach, thereby facilitating repeated printing from the same negative film and mask in register.

While the fifth method of photographic dodging described above has many advantages, it nevertheless suffers from certain defects. First, the negative film or transparency and the photochromic layer is each a separate sheet or layer thereby prohibiting precise register of negative film and photochromic layer even when conventional mechanical means such as clamps and the like are employed. The precise and immovable register of negative film and photochromic layer is of great importance in the automatic dodging of large numbers of negatives or of rolls of movie film. The absence of accurate register or disturbance of the layers will of course result in the necessity of erasing and reexposing the photochromic layer to impart a new masking image.

Secondly, it would be desirable to be able to reduce or regulate the thickness of the photochromic layer so as to decrease or regulate the defraction of light during the printing process, thereby permitting achievement of greater clarity or regulation of clarity in the final print. This becomes of particular importance when the combination of negative film and photochromic layer is to be used for high resolution enlarging.

Thirdly, unexposed or exposed negative photographic film having a built-in capability of being dodged would be useful as it would permit the operator to dodge by activation of the photochromic layer when and as long as he sees fit without having to superpose the negative film and the photochromic layer to reinstitute the original register. This would be beneficial, for example, when printing or projecting certain frames from the numerous pictures in a roll of developed movie film when it is desired to examine certain of the frames by activation of a photochromic layer to resolve foreground or background detail. Such flexibility of operation will therefore permit at the discretion of the operator dodging, no dodging at all or repeated dodging.

It is a further object of the invention to provide as an article of manufacture for photographic dodging, photoposed negative film which permits precise and semipermanent register of the negative photographic film and a photochromic layer thereby avoiding disturbance of said register and the consequent inconvenience of having to erase and re-expose the photochromic layer to photochromic activating light.

It is a further object of the invention to provide as an article of manufacture for photographic dodging photographic film having a photochromic layer wherein the thickness of the photochromic layer or supporting layer may be reduced or regulated so as to permit decreased defraction and greater clarity in projected images or positive prints produced therefrom.

Still another object of the invention is to provide as an article of manufacture for photographic dodging photographic film which permits flexibility and convenience of operation, e.g., allows the operator as he sees fit to dodge, not to dodge or to repeat dodging.

Yet another object of the invention is to provide a method of photographic dodging employing as an article of manufacture negative photographic film having a photochromic layer which is at all times in perfect register with the unexposed or exposed photographic emulsion thereby preventing disturbance of said register during projection or printing.

These and other objects and advantages of the invention will become apparent from the description which follows.

In accordance with the invention there is provided an article of manufacture photographic film comprising in unitary or integral sandwiched or laminate arrangement a transparent sheet coated on one surface with a photographic emulsion and contacted on the opposite surface with a photochromic layer. Use of this film provides a means of improving the contrast range of positive images or prints made therefrom and will provide other advantages described herein.

The transparent sheet may be any of the materials commonly employed in the photographic art as receiving sheets or webs for silver halide photographic emulsions. Suitable transparent sheet materials include, for example, transparent plastic substrates such as cellulose or cellulosic derivatives, e.g., cellulose acetate, cellulose butyrate, cellulose acetate butyrate, and the like. The transparent sheet is coated on one side with a photosensitive layer containing a gellatinous silver halide emulsion in the conventional manner of photographic negative film. However, on the side opposite the silver halide emulsion, the transparent sheet is contacted with a photochromic layer. By "contacted with" is meant that the photochromic layer is uniformly affixed to the transparent sheet in a manner to produce a unitary sandwich structure with the transparent sheet and silver halide emulsion.

Any photochromic material and any means known in the art for affixing a photochromic material as a layer to a transparent sheet may be employed to produce the unitary article of manufacture of the invention. By photochromic material is meant an organic or inorganic compound or mixture thereof with other materials which exhibit a reversible change in absorption spectrum upon irradiation with specific wave lengths of light. The photochromic or phototropic material must be reversible, i.e., upon removal of the activating radiation, the material must revert to its original state. Of particular interest in the present invention are photochromic materials which undergo a reversible color change when irradiated with light of a wave length below about 550 millimicrons and preferably in the range of from about 300 to 400 millimicrons (ultraviolet light range). The preferred materials revert back or bleach to the colorless state when the activating light is removed or when heated.

Representative photochromic organic compounds include the following: anils, e.g., salicyclidene-2-chloroaniline, 5'-chlorosalicylidine-aniline, and the like; aromatic nitro compounds, e.g., 2(2',4'-dinitrobenzyl)pyridine, o-nitrotoluene, and the like; bianthrone and related compounds, e.g., xanthylidineanthrone, and the like; indenone oxides, e.g., of the formula

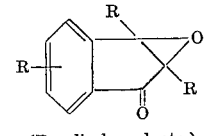

(R=alkyl, aryl, etc.)

e.g., 2,3-diphenylindenone oxide, and the like; spiropyrans, e.g., of the formula

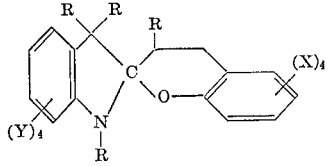

(X and Y=hydrogen, nitro, alkoxy, halo, etc.)

(R=hydrogen, alkyl, etc.), i.e., those compounds set forth in copending U.S. application, Ser. No. 239,333, P.N. 3,212,898, filed Nov. 21, 1962; cyclopent-4-en-1-one compounds of the formula

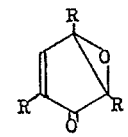

wherein R is substituted phenyl, substituted pyridyl, or a lower alkyl radical and said substituents are hydrogen, lower alkoxy, lower alkyl, nitro, cyano, halo, or alkoxy carbonyl radicals, such as those set forth in copending U.S. application, Ser. No. 312,850, P.N. 3,329,502, filed Oct. 1, 1963; dithizonates, such as mercury bis-dithizonate and those set forth in copending U.S. application Ser. No. 323,580, filed Nov. 14, 1963, and the like; and miscellaneous classes of organic compounds such as Ar—N=N—Ar, $Ar_3C$—CN (Ar=aryl), compounds of the formulas

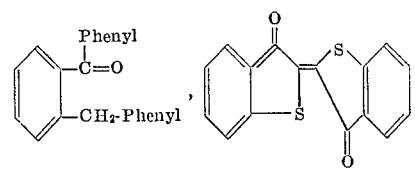

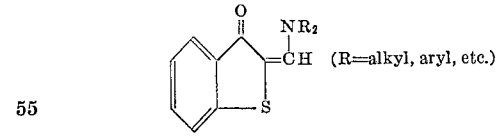

(R=alkyl, aryl, etc.)

N-4-hydroxybenzylideneaniline,
m-chloro-N-o-nitrobenzylideneaniline,
p-salicylideneaminobenzoic acid,
N-salicylideneaniline,
N-salicylidene-p-anisidine,
N-salicylidene-m-toluidine,
N-o-nitrobenzylidene-p-phenetidine,
anisaldehyde phenylhydrazone,
1-(p-methoxyphenyl)-1-penten-3-one semicarbazone,
cinnamaldehyde thiosenicarbazone;
fulgides, e.g., of U.S. Patent 2,305,693; β-tetrachloroketonaphthalene; and the compounds described in copending U.S. applications Ser. Nos. 418,328, P.N. 3,331,859; 418,337, 418,336, P.N. 3,331,854; 418,295, and 418,294, P.N. 3,321,491, all filed Dec. 14, 1964.

Included among inorganic photochromic materials are transition metal compounds admixed with oxygen-containing thermoplastic resins prepared from ethylenically unsaturated monomers including mixtures of different monomers. The transition metal compounds are those of the formula $$MX_mO_n(OR)_p \qquad (I)$$

wherein M is a transition metal; X is a halogen; R is an alkyl radical having 1–12 carbon atoms inclusive, an aryl radical having from 6–10 carbon atoms, inclusive, a $$-\underset{\underset{O}{\|}}{C}-R^1$$

radical wherein $R^1$ is an alkyl radical having from 1–12 carbon atoms, inclusive, or an aryl radical having from 6–10 carbon atoms, inclusive; $m$ and $p$ are whole, positive integers of from 0–6, inclusive; and $n$ is a whole, positive integer of from 0–2, inclusive; the total of $2n+m+p$ being equal to the valence of the metal M, at least one of $m$ and $p$ being an integer of at least 1.

Typical of such compounds are: titanium tetrachloride, titanium oxide dichloride, titanium tetramethoxide, titanium oxide dimethoxide, titanium dichloride dimethoxide, zirconium tetrachloride, zirconium oxide difluoride, zirconium tetraphenoxide, tungsten hexachloride, tungsten oxide tetrachloride, tungsten dioxide dichloride, tungsten hexabromide, tungsten oxide tetrabromide, tungsten hexamethoxide, tungsten oxide tetrabenzoate, tungsten pentachloride methoxide, hafnium tetrachloride, hafnium oxide dichloride, hafnium chloride triphenoxide, tantalum pentachloride, tantalum oxide trichloride, tantalum pentafluoride, tantalum pentamethoxide, chromium dioxide dichloride, chromium dioxide dimethoxide, vanadium oxide trichloride, vanadium dioxide bromide, vanadium dioxide methoxide, niobium pentachloride and the like. These and other materials of this type are disclosed together with oxygen-containing polymers in copending U.S. application Ser. No. 399,073, filed Sept. 24, 1964.

Other organic and inorganic photochromic materials, including individual compounds as well as mixtures or reaction products with other materials, useful in the present invention are materials such as described in Advances in Photochemistry, Interscience Publishers (1963), pp. 280–321. All of the above patents, patent applications and publications are incorporated herein by reference.

It will be understood that some of the photochromic materials enumerated herein and in the aforementioned references will be more useful than others by reason of photochromic activity at ambient temperatures, more rapid color change or color change in response to narrower ranges of wavelength or lower intensity of photochromically activating light. However, given the present disclosure one skilled in the art can conveniently choose the photochromic material giving optimum results for the desired end use.

Any means suitable for affixing a photochromic layer to the side of the transparent sheet opposite the photographic emulsion may be employed. Such means will, of course, depend upon the type of photochromic material used. Such means include any of the conventional coating techniques whereby a photochromic compound is dispersed in a solvent or resin or mixture of the two and the resulting solution coated on the transparent sheet. Any coating technique may be employed such as flow coating, spraying, dipping and the like. When the nature of the photochromic compound permits, the photochromic layer may be affixed by vacuum deposition.

Of particular interest in the present invention are photochromic layers fixed to the transparent sheet by the evaporation of solvent from a film-forming resin containing a photochromic compound. The resins include any of the optical quality thermoplastic resinous materials such as polymethyl methacrylate, polyethyl methacrylate, polybutyl methacrylate, polystyrene, polyvinyl chloride, polyvinyl acetate, cellulose acetate, and cellulose acetate butyrate. These organic film-forming materials may be employed as monomers, as partially polymerized materials or as polymers. From about 0.01 to 20%, preferably 0.1 to 10%, by weight of the photochromic compound in the organic film-forming carrier is generally suitable. Particular compositions of these types and techniques for affixing the photochromic layer to a transparent sheet are known in the art, e.g., French Patent 1,329,982 to Wagner et al. and U.S. Patent 3,105,761 to Foris.

The thickness of the photochromic layer may vary depending upon the choice of photochromic material and method of applying the photochromic layer to the transparent sheet. Varying effects may be provided by choice of thickness of the photochromic layer. It is an advantage of the instant article of manufacture that the thickness of the photochromic layer may be controlled according to the effects desired. For most purposes, however, the photochromic layer depth or thickness will be from about 0.1 to 5 mils and preferably 0.3 to 1.2 mils. Greater thicknesses may result in a tendency of the photographic film to crease or crack or too great actinic light refraction when producing the positive prints or images. Too thin layers, on the other hand, may result in a nonuniform photochromic layer or insufficient molecules of photochromic compound to provide efficient dodging.

Included in the scope of the invention is photographic film as an article of manufacture wherein the silver halide emulsion has not been exposed to image bearing actinic light prior to contacting the transparent sheet substrate with the photochromic layer. Such products could be sold as unexposed negative film. Once a negative image is imparted to the film it may subsequently be masked by activation of the photochromic layer prior to or simultaneously with printing. The invention also includes a negative film exposed so as to carry a negative image prior to being contacted with the photochromic layer on the side opposite the photographic emulsion.

Photochromic layer materials may be chosen, such as the aforementioned film-forming compositions, whereby the photochromic layer may be removed as by peeling, stripping or dissolving from the transparent sheet when it has served its purpose for photographic dodging.

The method of photographic dodging of the invention comprises exposing the photochromic layer of the above-described photographic film to ultraviolet or other photochromically activating light through the negative image previously imparted by image bearing actinic light to the upper layer of photographic emulsion. By virtue of this step a masking image of the negative image is formed in the photochromic layer.

In the second step of the method (performed after or simultaneously with the first step), a photosensitive sheet, i.e., positive printing paper, is exposed to actinic light through the unitary photographic film carrying both the negative image and the masking image. There results on the photosensitive sheet a positive image having a modified density scale as compared to the density scale which would result from merely forming a positive print from the negative image alone, i.e., a negative image which has not been masked with the photochromic layer. Described otherwise the result is to soften the large area contrast while retaining or enhancing fine detail contrast of the negative image. Since the masking photochromic layer is at all times in perfect register with the negative image containing layer no problem is encountered in making several prints from the same masked negative or in printing frames from a roll of film. Moreover, if the desired degree of dodging is not initially provided, the photochromic layer may be bleached by exposure to wave lengths of light other than ultraviolet and the masking step repeated.

The method of dodging herein described may be termed an "unsharp masking" technique since an out-of-focus positive reversal image, formed on the photochromic layer, is used to improve the contrast range in a positive print prepared therefrom. Variations in this technique including effects of modifying the thickness of the intervening transparent support sheet member will be apparent to those skilled in the art in view of the instant disclosure and, for example, the article "The Unsharp Mask Technique of Printing Aerial Negatives" by J. A. Eden, The Photogrammetric Record, vol. 1, April 1945, which is incorporated herein by reference.

It will be appreciated that the instant article of manufacture and method of dodging permit not only the preparation of individual prints having modified density scales, but also provides a means of projecting an image from movie film or slide transparencies, as onto a projection screen, in which each frame may be dodged uniformly and in a predetermined degree depending upon the thickness of the photochromic layer throughout the entire length of the film roll or series of slides. Unusual effects may also be accomplished by the technique of projecting a positive image onto photosensitive printing paper or a projection screen in which both actinic light and ultraviolet light are passed simultaneously through the negative image and photochromic layer. In this way the density scale of the positive image is being modified at the same time it is being printed or projected by the non-photochromic activating light.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

A photochromic coating solution is prepared containing polymethyl methacrylate at 20% resin solids dissolved in a 3:1:4 by volume solvent mixture of methylethyl ketone, methylisobutyl ketone and toluene, respectively, and 7% by weight on the resin of 1,3,3-trimethyl-6'-nitro-spiro (2'H-1'-benzopyran-2,2'-indoline), i.e.,

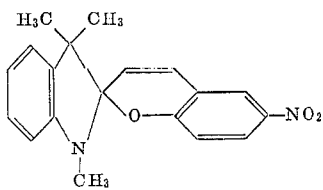

This solution is drawn down with a doctor knife onto 3 mil thick commercially available transparent polyester film. The solvent mixture is then evaporated leaving a photochromic layer on the film of about 1 mil in thickness.

The resultant photochromic film layer is then affixed by a commercially available adhesive to the back of a developed photographic negative, i.e., is affixed to that surface of the negative which does not contain the image-producing residue of the silver halide photographic emulsion.

The resulting photographic film sandwich is illustrated by FIGURE 1 of the accompanying drawing in which 1 is the layer comprising the photochromic material remaining on the transparent support sheet 2a (transparent polyester film of the instant example) after evaporation of the solvent from the mixture of solvents, polymethyl methacrylate and indoline compound; 3 is the negative image-producing residue of a silver halide photographic emulsion, and 2b is a transparent support sheet for said emulsion residue. The combination of 3 and 2b is a conventional developed photographic negative film. Transparent support sheets 2a and 2b are made integral in the sandwich by the adhesive (not shown).

EXAMPLE 2

Again with reference to FIGURE 1, the photographic film sandwich of Example 1 is placed in a photographic enlarger in the normal position with respect to positive print paper 4 and is then irradiated with an ultraviolet light source 5 until a reversal image (mask) of the photographic negative image having the desired density is formed on the photochromic layer 1.

Actinic light (white light) from a suitable source 6 is then passed through the sandwich to form a positive image on photographic positive printing paper 4 in accordance with standard photographic printing technique. Although FIGURE 1 shows irradiation of the sandwich from above, it will be obvious that irradiation may be affected from any angle or side of the sandwich so long as the actinic light passes through the masked sandwich.

By the foregoing photographic dodging method a developed negative having two areas of optical densities of 0.5 and 0.05, respectively, i.e., differing by an optical density of 0.45, is masked by 80 seconds exposure to a fluorescent ultraviolet blacklight source. When the resulting masked negative image is used to form a positive image on the photographic print paper there is obtained optical densities of 0.1 behind the 0.5 density negative area and 0.3 behind the 0.05 density negative area, thereby reducing the area density difference between the two negative areas from 0.45 (0.5 minus 0.05) to 0.25 (0.5 minus 0.35). All optical densities are measured in a spectrophotometer at 580 millimicrons.

The photochromic layer may be removed by peeling after use if desired.

EXAMPLE 3

FIGURE 2 of the accompanying drawing illustrates another embodiment of the invention. In reference thereto, 1 is a photochromic layer formed in this case by directly coating the transparent sheet support side 2b of a conventional unexposed photographic negative having an unexposed silver halide photographic emulsion 3 on the opposite side of said support sheet, with a photochromic coating solution substantially as described in Example 1. The coating is done, of course, in a photographic darkroom. Thereafter, a negative image is formed on the film which is masked and then printed while dodging in substantially the same manner as described in Example 2.

No problems are encountered in the foregoing examples with registration of the photochromic masking layer and photographic negative even when masking is repeated. Moreover, by regulation of thickness of the transparent supporting sheet or sheets, various degrees of dodging are obtained in a perfectly uniform manner for each of the prints made from film of the same dimensions.

Copending application Serial No. 464,412, filed on the same day, also discloses photographic film and a method for photographic dodging. That invention, although similar in some respects, differs in at least one essential, namely, the photochromic layer is in direct contact with the photographic emulsion. This provides certain advantages detailed therein. The subject matter of said copending application is incorporated herein by reference.

We claim:
1. A method of photographic dodging which comprises, (1) exposing to visible light a photographic film comprising in permanent integral laminate arrangement a transparent support sheet having on one surface an unexposed silver halide photographic emulsion layer and on the opposite surface a photochromic layer, to form an image in said silver halide emulsion, (2) developing said image in said silver halide emulsion, (3) passing ultra-violet light through said silver halide image bearing layer to form a masking image in said photochromic layer, and (4) passing visible light through the masked image to form a positive image having improved contrast range.

2. The method of claim 1 wherein said positive image is formed on a photosensitive sheet.

References Cited
UNITED STATES PATENTS
| | | | |
|---|---|---|---|
| 2,036,369 | 4/1936 | Simjian | 96—68 |
| 3,105,761 | 10/1963 | Foris. | |
| 3,160,504 | 12/1964 | Montani. | |

FOREIGN PATENTS
| | | |
|---|---|---|
| 891,992 | 8/1958 | Great Britain. |

OTHER REFERENCES
"Printed-Out Masks." Camera, May 1964, p. 37.
"Novel Photochromic Systems for Photographic Masking." Phot. Sci. and Eng., vol. 9, No. 1, January-February 1965, pp. 67–71.

J. TRAVIS BROWN, *Primary Examiner.*
CAROLYN E. DAVIS, *Assistant Examiner.*

U.S. Cl. X.R.
96—68, 90